(12) United States Patent
Vorwaller (10) Patent No.: US 12,433,274 B2
(45) Date of Patent: Oct. 7, 2025

(54) FISHING LURE

(71) Applicant: Casey Vorwaller, Francis, UT (US)

(72) Inventor: Casey Vorwaller, Francis, UT (US)

(*) Notice: Subject to any disclaimer, the term of this patent is extended or adjusted under 35 U.S.C. 154(b) by 125 days.

(21) Appl. No.: 17/897,161

(22) Filed: Aug. 27, 2022

(65) Prior Publication Data
US 2023/0117145 A1    Apr. 20, 2023

Related U.S. Application Data

(60) Provisional application No. 63/257,569, filed on Oct. 19, 2021.

(51) Int. Cl.
A01K 85/00 (2006.01)

(52) U.S. Cl.
CPC ........ A01K 85/1803 (2022.02); A01K 85/029 (2022.02)

(58) Field of Classification Search
CPC ............................ A01K 85/1803; A01K 85/029
USPC .......... 43/42.47, 42.09; 446/85, 87, 99, 100, 446/101, 120, 121; 403/289, 292, 297, 403/298, 300, 314, 321, 325–327, 329, 403/345, 375, 381, 409.1
See application file for complete search history.

(56) References Cited

U.S. PATENT DOCUMENTS

| | | | | |
|---|---|---|---|---|
| 530,862 A * | 12/1894 | Teed | ......................... | E05C 1/04 24/654 |
| 2,036,075 A * | 3/1936 | Peterson | ................. | A01K 85/16 43/42.47 |
| 2,494,384 A * | 1/1950 | Gadzinski | .............. | A01K 85/16 43/42.22 |
| 2,538,181 A * | 1/1951 | Yates | ...................... | A01K 85/16 43/42.22 |
| 2,659,176 A * | 11/1953 | Wenger | ................... | A01K 85/16 43/42.31 |
| 2,680,927 A * | 6/1954 | Napier | .................... | A01K 85/16 43/42.22 |
| 2,852,881 A * | 9/1958 | Higdon | ................... | A01K 85/16 43/42.47 |
| 2,883,785 A * | 4/1959 | Croft | ....................... | A01K 85/16 43/42.22 |
| 2,923,083 A * | 2/1960 | Bailer | ..................... | A01K 85/16 43/42.36 |
| 2,954,634 A * | 10/1960 | Peschong | ............... | A01K 85/16 403/375 |
| 2,982,586 A * | 5/1961 | Gliebe | .................... | A01K 77/00 403/287 |
| 3,091,883 A * | 6/1963 | Hufford | ................. | A01K 85/16 43/42.36 |
| 3,205,609 A * | 9/1965 | Knapton | ................ | A01K 85/16 43/42.22 |

(Continued)

FOREIGN PATENT DOCUMENTS

| AU | 2008200272 A1 * | 8/2008 | |
|---|---|---|---|
| AU | 2008100862 A4 * | 10/2008 | ............. A01K 85/16 |

(Continued)

*Primary Examiner* — Darren W Ark (74) *Attorney, Agent, or Firm* — BATEMAN IP; Randall B. Bateman (57) ABSTRACT

A fishing lure may include a body and a removable lip, which may be removed manually without the use of tools by pressing on portions of the body to release a catch between the removable lip and the body.

15 Claims, 7 Drawing Sheets

(56) References Cited

U.S. PATENT DOCUMENTS

| | | | | |
|---|---|---|---|---|
| 3,608,228 A * | 9/1971 | Borresen et al. | A01K 85/01 | |
| | | | 43/42.22 | |
| 4,183,164 A * | 1/1980 | Young | A01K 85/16 | |
| | | | 43/42.36 | |
| 4,402,155 A * | 9/1983 | Mumma | A01K 85/16 | |
| | | | 43/42.08 | |
| 4,697,378 A * | 10/1987 | Tunstall | A01K 85/16 | |
| | | | 43/42.22 | |
| 4,807,387 A * | 2/1989 | Dougherty, Jr. | A01K 85/16 | |
| | | | 43/42.22 | |
| 4,944,112 A * | 7/1990 | Garmany | A01K 85/16 | |
| | | | 43/42.22 | |
| 5,337,508 A * | 8/1994 | Pfeiffer | A01K 85/16 | |
| | | | 43/42.22 | |
| 5,351,433 A * | 10/1994 | Ellis | A01K 85/16 | |
| | | | 43/42.22 | |
| 5,566,496 A * | 10/1996 | Rutherford | A01K 85/16 | |
| | | | 43/42.47 | |
| 5,600,916 A * | 2/1997 | Smith | A01K 85/16 | |
| | | | 43/42.49 | |
| 5,918,405 A * | 7/1999 | Marusak | A01K 85/00 | |
| | | | 43/42.34 | |
| 5,937,569 A * | 8/1999 | Solheim | A01K 85/16 | |
| | | | 43/42.49 | |
| 6,058,643 A * | 5/2000 | Marusak | A01K 85/16 | |
| | | | 43/42.34 | |
| 6,079,145 A * | 6/2000 | Barringer | A01K 85/01 | |
| | | | 43/42.22 | |
| 7,371,146 B2 * | 5/2008 | Scarborough | A63H 33/084 | |
| | | | 446/124 | |
| 8,028,464 B2 * | 10/2011 | Smith | A01K 85/16 | |
| | | | 43/42.22 | |
| 8,720,104 B2 * | 5/2014 | Smith | A01K 85/00 | |
| | | | 43/42.22 | |
| 9,345,237 B2 * | 5/2016 | Rapelje | A01K 85/16 | |
| 9,713,321 B2 * | 7/2017 | Smith | A01K 85/16 | |
| 10,085,432 B2 * | 10/2018 | Reyment | A01K 85/16 | |
| 10,470,447 B2 * | 11/2019 | Takahashi | A01K 85/16 | |
| 10,561,958 B2 * | 2/2020 | Purwar | A63H 33/12 | |
| 11,224,210 B2 * | 1/2022 | Olson | A01K 85/00 | |
| 12,064,988 B1 * | 8/2024 | He | B43K 23/06 | |
| 2002/0007583 A1 * | 1/2002 | Nelson | A01K 85/18 | |
| | | | 43/42.09 | |
| 2002/0121043 A1 * | 9/2002 | Hawkins | A01K 83/06 | |
| | | | 43/42.09 | |
| 2004/0006909 A1 * | 1/2004 | Essad | A01K 85/16 | |
| | | | 43/42.22 | |
| 2005/0217165 A1 * | 10/2005 | Anderson | A01K 85/00 | |
| | | | 43/42.39 | |
| 2007/0199233 A1 * | 8/2007 | Higgin | A01K 85/16 | |
| | | | 43/42.31 | |
| 2008/0077063 A1 * | 3/2008 | Meyer | F16B 7/0426 | |
| | | | 403/345 | |
| 2011/0258906 A1 * | 10/2011 | Ford | A01K 85/16 | |
| | | | 43/42.49 | |
| 2013/0192121 A1 * | 8/2013 | Ford | A01K 85/00 | |
| | | | 43/42.22 | |
| 2013/0205643 A1 * | 8/2013 | Smith | A01K 85/00 | |
| | | | 43/42.09 | |
| 2019/0269112 A1 * | 9/2019 | Olson | A01K 85/16 | |
| 2022/0400660 A1 * | 12/2022 | Teschendorf | A01K 85/01 | |

FOREIGN PATENT DOCUMENTS

| | | | | |
|---|---|---|---|---|
| AU | 2017204428 A1 | * | 1/2018 | |
| CN | 208523573 U | * | 2/2019 | |
| JP | 2001292662 A | * | 10/2001 | |
| JP | 3163368 U | * | 10/2010 | |
| JP | WO2014002157 A1 | * | 5/2016 | |
| JP | 2017127236 A | * | 7/2017 | |
| JP | 2019187248 A | * | 10/2019 | |
| WO | WO-2020041840 A1 | * | 3/2020 | A01K 85/16 |
| WO | WO-2021201687 A1 | * | 10/2021 | A01K 85/00 |

* cited by examiner

FISHING LURE

BACKGROUND

State of the Art

The present disclosure relates to a fishing lure. More particularly, the present disclosure relates to a fishing lure with a removable lip or bill.

Field of Art

When fishing, it is common for people to use fishing lures. Many fishing lures include a body which looks like a fish, or other water creature, such as a crayfish, a frog, etc. The body will typically have one, two or three treble hooks attached thereto, depending on the length of the body, whether the body is jointed and the size of the fish that a person is fishing for. Such lures are often called crank bait or jerk bait depending on the length of the body and the number of treble hooks attached.

Many lures also have a structure attached toward the front of the body which extends downwardly at an angle from the longitudinal axis of the body. The structures are commonly referred to as lips, bills or bibs and will be referred to herein collectively as lips. The lips can come in numerous different shapes, including, but not limited to rounded lips, square lips, coffin lips, cupped lips, etc. The lip serves two purposes. The shape of the lip helps to cause the body to wiggle, giving the bait the appearance of an injured fish trying to swim. This attracts predator fish to what the fish sees as easy prey.

The size and curvature of the lip and the angle at which it extends from the body can also be used to control the depth at which the lure will "swim" depending on how fast the user reels in the line. The larger the lip and the angle of the lip, the more resistance the lip will provide against the water as the fishing line to which it is attached is reeled in. The angle of the lip will try and drive the lure downwardly as the lure moves through the water while reeling in the line, and any buoyancy in the body will try and move the lure upwardly. The larger the lip, the more tendency the lure will have to dive as the line is being reeled in. Thus, for example, a smaller lip may cause a body of a certain size to travel at 3-5 feet below the surface, while a much larger lip may cause a lure of the same size to travel at 15-20 feet below the surface.

A person fishing must try and figure out what lure pattern fish are feeding on and must also determine the depth at which to fish. For example, drawing a lure through the water at 5 feet deep will have little likelihood of catching a fish if most of the fish are 20-25 feet deep. Additionally, a person fishing may take a couple of fish at a given depth and need to leave that area unfished for a while to allow other fish to move into that location.

Because of this, it is common for people fishing to frequently change their lures. A person may fish at 5 feet deep for a few minutes. After receiving no bites, he or she may change the lure for one that is desired to travel about 10 feet deep and try that depth for several minutes. A new lure may then be tried to fish at 15-20 feet deep, followed by yet another lure for 20-25 feet deep. All of this takes time and lessens the enjoyment of the fishing.

Lure changes are also common because fish will feed on different forage creatures at different times. One day a lure resembling a small fish, such as a rainbow trout or chub, may be very successful. At other times, a lure resembling a crayfish, or a frog may be much better.

The variety of baits designed for different depths and different body styles can result in a person fishing spending a considerable amount of time changing lures. It can also be very expensive. A quality lure can easily cost $15-20. If one has five different body types (rainbow, minnow, shad, frog and crayfish) with lips designed for 5 feet, 10 feet, 15 feet and 20-25 feet, the person will be carrying different lures at a cost of $300 to $400. This does not even take into consideration size differences in the lures depending on the size of fish which are biting. Thus, there is a need for a fishing lure which reduces the number of lures needed for fishing.

Attempts have been made in the past to provide lures in which the lips can be removed and replaced. For example, U.S. Pat. No. 5,566,496 teaches a rigid body portion (14) and rigid bill inserts (42) which include a locking tab (48) which are slid into a slot in the body and locks the rigid bill inserts in place. An ejector tool may be inserted into the body to engage the locking tab and release the insert. One disadvantage with the arrangement taught is that a tool is required to release the bill. Not only does this take time and dexterity, if the tool is dropped in the water the person attempting to change the bill may be unable to remove it.

U.S. Pat. No. 5,918,405 teaches another configuration where the fishing lure includes a lip which can be inserted into the frame. The lip may include a body portion with two opposing legs having protrusions formed near their ends. The frame includes a cavity which is adapted to receive the legs of the lip. The cavity also includes fingers which are adapted to engage the protrusions on the legs to secure the lip in place. From the drawings, it appears that the lip can simply be slid out as the fingers are rounded.

U.S. Patent Publication 2004/0006909 teaches a lure body having a slot of various cross-sections so that a bill may be slide sideways into the slot to attach the bill to the lure body.

Numerous other attempts have attempted to solve the problem of replaceable lips or bills, including U.S. Pat. Nos. 4,215,507, 4,697,378, 4,944,112 and 5,331,762. Each has respective advantages and disadvantages. However, each tend to either take excess time to effect the change and/or risk the loss of the lip under the strain of bringing in a fish. Thus, there is a need for an improved lure with a replaceable lip.

SUMMARY

The following summary of the present disclosure is not intended to describe each illustrated embodiment, or every possible implementation of principles contained herein, but rather to give illustrative examples of application of the principles with the scope of the invention being determined by the attached claims.

A fishing lure may comprise a lure body having a slot and a catch for receiving a proximal portion of a lip. The lip may include one or more projections for engaging the catch to hold the lip in the slot until the projections are released from the catch.

In one or more embodiments the lure body may have a first side, a second side and a catch disposed on the first side and the second side for engaging the projections of the lip.

In one or more embodiments, the lure body may have a first arm which is pivotable between a first position and a second position, the first arm engaging a portion of the lip to move a projection on a first arm of the lip out of engagement with a catch on the body when in the second position.

In one or more embodiments, the lure body may have a second arm which is pivotable between a first position and a second position, the second arm being positioned to engage the lip and move a projection on a second arm of the lip out of engagement with a catch on the body when the second arm is disposed in the second position.

In one or more embodiments, at least one of the first arm and the second arm may be located along the body in a position at which a gill would be disposed on a normal fish.

In one or more embodiments, the lure body may include a line arm attached at a first end to the body and having a second end which forms a loop extending beyond the most proximal end of the body and disposed above a lip when the lip is inserted into the slot, so that the body can remain attached to a fishing line while a lip is removed or inserted into the body.

These and other aspects of the present invention are realized in a fishing lure with a lure body and a lip selectively retainable within the lure body.

BRIEF DESCRIPTION OF THE DRAWINGS

Various embodiments of the present disclosure are shown and described in reference to the numbered drawings wherein.

It will be appreciated that the drawings are illustrative and not limiting of the scope of the present disclosure, which is defined by the appended claims. The embodiments shown accomplish various aspects and objects. It will be appreciated that it is not possible to clearly show each element and aspect of the present disclosure in a single figure, and as such, multiple figures are presented to separately illustrate the various details of different aspects of the present disclosure in greater clarity. Similarly, not all configurations or embodiments described herein or covered by the appended claims will include all the aspects of the present disclosure as discussed above.

DETAILED DESCRIPTION

Various aspects of the invention and accompanying drawings will now be discussed in reference to the numerals provided therein so as to enable one skilled in the art to practice the present invention. The skilled artisan will understand, however, that the apparatus and methods described below can be practiced without employing these specific details, or that they can be used for purposes other than those described herein. Indeed, they can be modified and can be used in conjunction with products and techniques known to those of skill in the art in light of the present disclosure. The drawings and the descriptions thereof are intended to be exemplary of various aspects of the invention and are not intended to narrow the scope of the appended claims. Furthermore, it will be appreciated that the drawings may show aspects of the invention in isolation and the elements in one figure may be used in conjunction with elements shown in other figures.

Reference in the specification to "one embodiment," "one configuration," "an embodiment," or "a configuration" means that a particular feature, structure, or characteristic described in connection with the embodiment may be included in at least one embodiment, etc. The appearances of the phrase "in one embodiment" in various places may not necessarily limit the inclusion of a particular element of the invention to a single embodiment, rather the element may be included in other, or all embodiments discussed herein.

Furthermore, the described features, structures, or characteristics of embodiments of the present disclosure may be combined in any suitable manner in one or more embodiments. In the following description, numerous specific details may be provided, such as examples of products or manufacturing techniques that may be used, to provide a thorough understanding of embodiments of the invention. One skilled in the relevant art will recognize, however, that embodiments discussed in the disclosure may be practiced without one or more of the specific details, or with other methods, components, materials, and so forth. In other instances, well-known structures, materials, or operations may not be shown or described in detail to avoid obscuring aspects of the invention.

Before the present invention is disclosed and described in detail, it should be understood that the present invention is not limited to any particular structures, process steps, or materials discussed or disclosed herein, but is extended to include equivalents thereof as would be recognized by those of ordinarily skill in the relevant art. More specifically, the invention is defined by the terms set forth in the claims. It should also be understood that terminology contained herein is used for the purpose of describing particular aspects of the invention only and is not intended to limit the invention to the aspects or embodiments shown unless expressly indicated as such. Likewise, the discussion of any particular aspect of the invention is not to be understood as a requirement that such aspect is required to be present apart from an express inclusion of that aspect in the claims.

It should also be noted that, as used in this specification and the appended claims, singular forms such as "a," "an," and "the" may include the plural unless the context clearly dictates otherwise. Thus, for example, reference to "a bracket" may include an embodiment having one or more of such brackets, and reference to "the target plate" may include reference to one or more of such target plates.

As used herein, the term "substantially" refers to the complete or nearly complete extent or degree of an action, characteristic, property, state, structure, item, or result to function as indicated. For example, an object that is "substantially" enclosed would mean that the object is either completely enclosed or nearly completely enclosed. The exact allowable degree of deviation from absolute completeness may in some cases depend on the specific context, such that enclosing nearly all of the length of a lumen would be substantially enclosed, even if the distal end of the structure enclosing the lumen had a slit or channel formed along a portion thereof. The use of "substantially" is equally applicable when used in a negative connotation to refer to the complete or near complete lack of an action, characteristic, property, state, structure, item, or result. For example, structure which is "substantially free of" a bottom would either completely lack a bottom or so nearly completely lack a bottom that the effect would be effectively the same as if it completely lacked a bottom.

As used herein, the term "generally" refers to something that has characteristics of a quality without being exactly that quality. For example, a structure said to be generally vertical would be more vertical than horizontal, i.e., would extend greater than 45 degrees from horizontal. Likewise, something said to be generally circular may be rounded like an oval but need not have a consistent diameter in every direction.

As used herein, the term "about" is used to provide flexibility to a numerical range endpoint by providing that a given value may be "a little above" or "a little below" the endpoint while still accomplishing the function associated with the range.

As used herein, a plurality of items, structural elements, compositional elements, and/or materials may be presented in a common list for convenience. However, these lists should be construed as though each member of the list is individually identified as a separate and unique member.

Concentrations, amounts, proportions, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 2, 3, 4, and 5, individually. This same principle applies to ranges reciting only one numerical value as a minimum or a maximum. Furthermore, such an interpretation should apply regardless of the breadth of the range or the characteristics being described.

Figure 1:
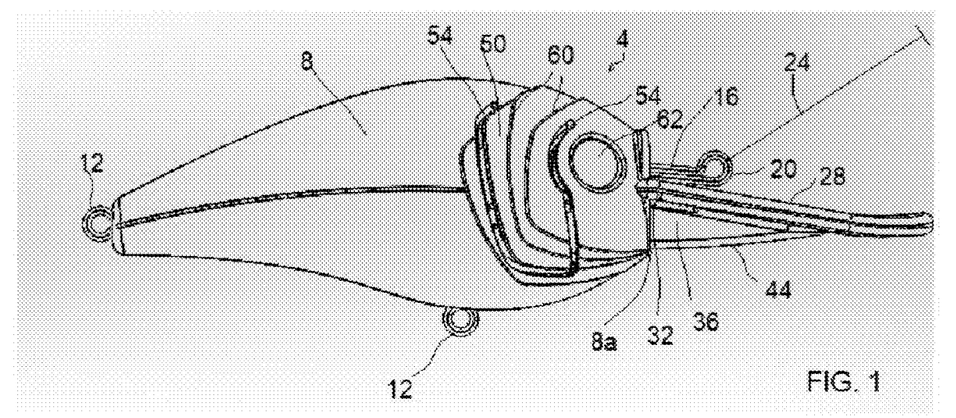
FIG. 1 shows a side view of a fishing lure with a lip inserted therein.

Turning now to FIG. 1, there is shown a side view of a fishing lure, generally indicated at 4. In one embodiment the fishing lure 4 may include a body 8 which may be formed to generally resemble an aquatic creature such as a fish, a crayfish, a frog, etc. The body 8 may include one or more eyelets 12 which may be used to attach a hook, such as a treble hook, or another body portion.

The fishing lure 4 may also include a fishing line loop 16. The fishing line loop 16 may have a first end which is attached to the body 8 (the first end being disposed inside the body in FIG. 1) and an opposing second end 20 which extends beyond and away from the body. The fishing line loop 16 may be configured to attach a fishing line 24 thereto so that the fishing line remains attached to the body 8.

Figure 17:
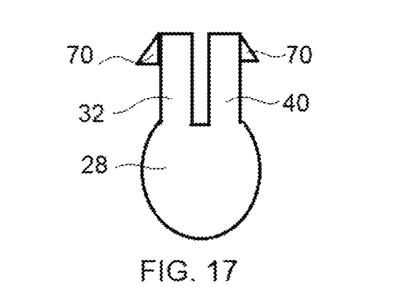
FIG. 17 shows yet another lip having a first arm and a second arm.
Figure 18:
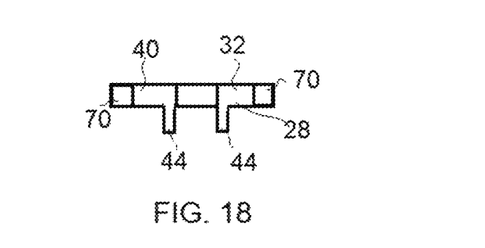
FIG. 18 shows an end view of the lip of FIG. 17 showing the support structures on the first arm and second arm.

Also shown in FIG. 1 is a lip 28 which may be partially inserted into the body 8 to change the performance characteristics of the body as the fishing line 24 is being reeled in. The lip 28 may include a first lip arm 32, a second lip arm (not visible in FIG. 1, and least one third lip arm 36. The first lip arm 32 may include a catch or projection which engages a structure within the body 8. The third lip arm or arms 36 may be taller or thicker than the first arm, and/or may include a flange 44, so that the third lip arm or arms 36 provide structural support to the lip 28. A third lip arm may likewise include a projection or catch for engaging a structure within the body. While described herein as there being one or more third lip arms to provide support for the lip, it will be appreciated that one or both of the first lip arm 32 and the second lip arm may have a projection or may be thicker in one dimension to provide more strength or rigidity to the lip in one direction while still allowing the first lip arm or the second lip arm to provide support without the need for the second lip arms as shown in FIGS. 17 and 18.

The body 8 may also include one or more body arms 50 which may be formed in the wall forming the body. As shown in FIG. 1, a first body arm 50 may be disposed on the side of the body in a location similar to where a gill would be positioned on a fish, i.e., spaced distally a short distance from the proximal end of the body. The body arm 50 may be formed in the body 8 by either molding or cutting one or more elongate openings 54 into the body so as to leave a portion which will flex relative to the remainder of the body. As will be explained in additional detail below, the body arm 50 may flex inwardly when pressure is applied thereto to apply pressure one of the arms on the lip to thereby release a catch between the lip 28 and the body 8 to facilitate removal of the lip from the body.

The side view shown in FIG. 1 may be the mirror image of an opposing side of the body 8 in an embodiment where a second body arm is formed in the body. It will be appreciated that in some embodiments, a second body arm may not be used in the body and the opposing sidewall would be continuous.

Figure 2:
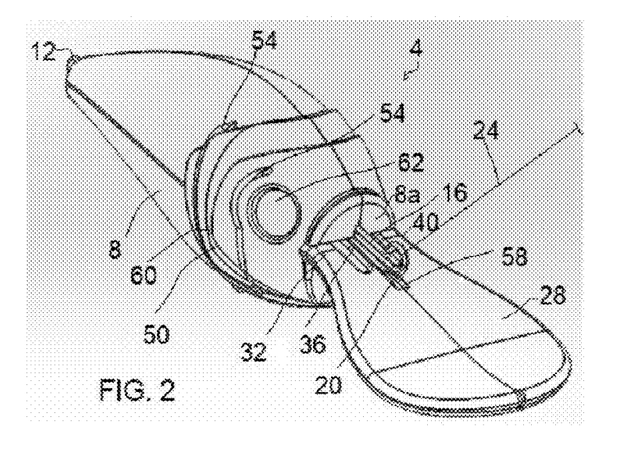
FIG. 2 shows a front perspective view of the fishing lure of FIG. 1.

Turning now to FIG. 2, there is shown a perspective view of the body 8 and the lip 28. As can be seen more clearly, the lip 28 may include the first lip arm 32, a second lip arm 40, and one or more third lip arms 36. The one or more third lip arms 36 may be formed as a plurality of arms spaced apart from one another or may be a single arm which may include a channel 58 for receiving the fishing line loop 16. It will be appreciated that in many fishing lures having lips, bills or bibs, the fishing line is attached to an eyelet disposed on the lip, etc., to give the lure the desired play in the water. In accordance with one aspect of the invention, the fishing line loop 16 extends proximally from the lure body 8 so that the end of the fishing line loop to which the fishing line attached is dispose out over the lip 28, etc. However, because the fishing line loop 16 may be attached to the body 8 directly, no strain is placed on the lip 28 by tension on the fishing line.

The body arm 50 may be formed by the opening 54 which extends approximately around three sides of the body arm so that the body arm may remain attached at one end. This allows the body arm 50 to pivot inwardly when force is applied thereto. Ridges 60 may be formed on the body arm 50 for reinforcement, or as mere decoration. The ridges may also provide a person using the lure with a tactile indication of when his or her fingers are disposed on the arm so force can be applied to release the lip 28 from the body 8.

When using a fishing lure 4 such as that shown, the person fishing will usually hold the fishing lure on the opposing sides to keep his or her hands from contacting the hooks (usually treble hooks) attached to the eyelets 12. As will be explained below in additional detail, pressing inwardly on the body arm(s) 50 with sufficient pressure deflects one or both of the lip arms 32 and 40 inwardly and releases a catch mechanism formed between the body 8 and the arms of the lip 28, thereby allowing the lip 28 to be pulled out of the body.

Figure 3:
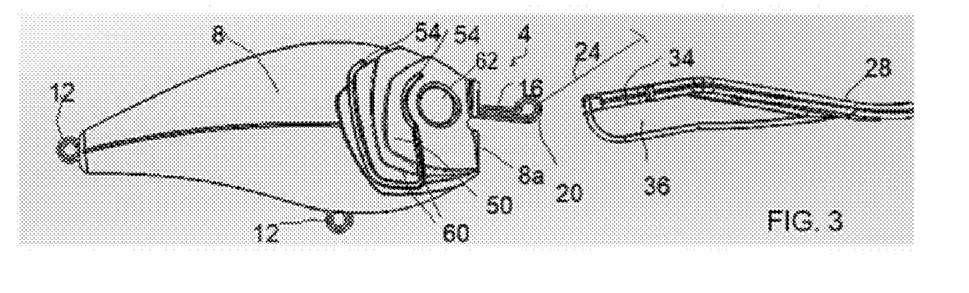
FIG. 3 shows a side view of the fishing lure of FIG. 1 with the lip removed.
Figure 4:
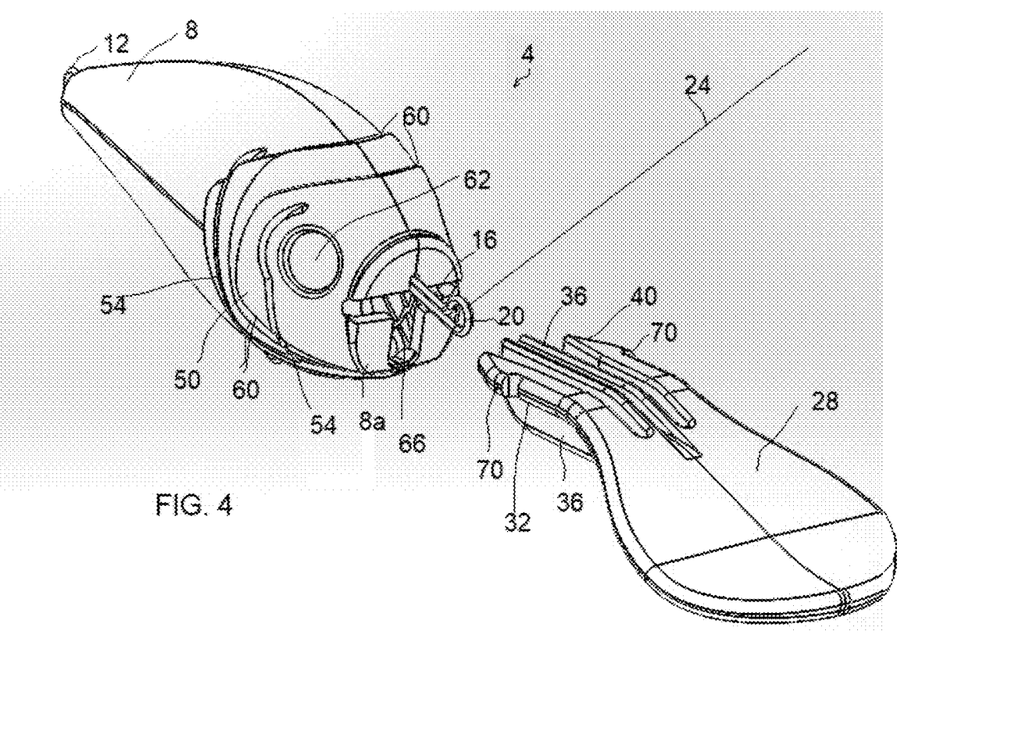
FIG. 4 shows a front perspective view of the fishing lure of FIG. 3.

FIGS. 3 and 4 show a side view and a perspective view, respectively, of the body 8 with the lip 28 having been removed so that another lip (see e.g., FIGS. 10-13) can be inserted and thereby change the action of the fishing lure (such as depth at which the lure travels based on the speed at which the lure is reeled in, or how much side-to-side movement the lure provides as it "swims.") It will be appreciated that numerous attempts have been made to provide a removable lip because of the time lost during fishing if one has to repeatedly attach a new fishing lure to the fishing line. The present invention allows a person fishing to change the lip 28 within seconds without the use of tools and while ensuring the lip 28 is securely attached to the body 8 while fishing.

As shown in FIG. 4, a generally T-shaped slot 66 may be formed in the proximal end 8a of the body 8 to facilitate the insertion of a lip 28 into the body. Depending on the shape of the lip arms 32, 36, 40, the slot 66 may also have other shapes. The slot 66 may allow the lip 28 to have reinforcement so that the lip is less likely to break if swallowed by a fish or caught in aquatic vegetation or on a rock. The formation of the lip arms 32, 36 and 40 is discussed in additional detail with respect to FIGS. 6 and 7.

To add a lip 28 to the body 8, the user need simply grab the lip 28 and insert the distal ends of the lip arms 32, 36, 40 into slot 66. The lip 28 may be advanced until a catch mechanism is engaged. As shown in FIG. 4, the catch mechanism may include projections 70 which extend outwardly from the first lip arm 32 and the second lip arm 40. As the lip is advanced, the first lip arm 32 and second lip arm 40 may deflect inwardly (i.e., toward the longitudinal axis of the lip) so that the projections 70 may pass by a catch within the body 8. Once the projections 70 pass the catch, the first lip arm 32 and the second lip arm 40 will bias the projections outwardly to maintain engagement with the catch and prevent accidental removal of the lip 28.

Figure 5:
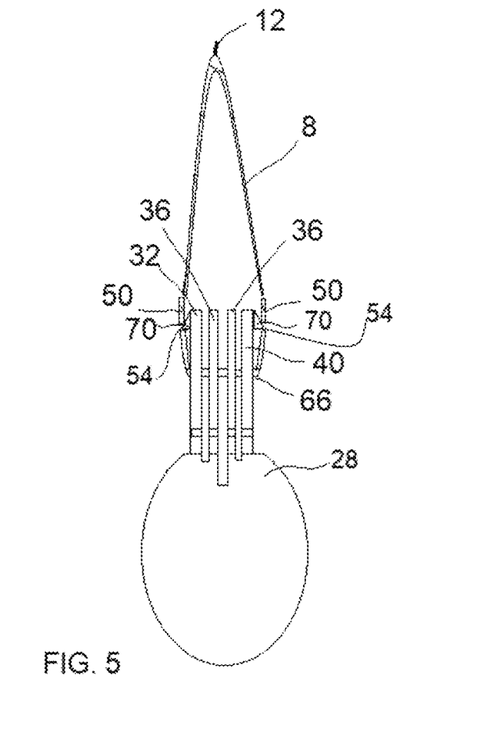
FIG. 5 shows a top, cut-away view of the fishing lure of FIG. 1.

Turning now to FIG. 5, there is shown a cross-sectional view of the body 8 with a lip 28 inserted therein. The distal end of the lip 28 may be inserted into the slot 66 and advanced so that the projections 70 extend into the openings 54 and catch against the body wall that defines the opening and thereby secure the lip in the body. To release the lip 28 from the body, the body arms 50 can be pressed inwardly causing the first and second lip arms 32 and 40 to deflect inwardly and removing the projections 70 from the opening 54. This allows the lip 28 to be removed from the body 8 and a new lip inserted into the body and advanced until the projections on that lip nest in the openings 54.

Figure 6:
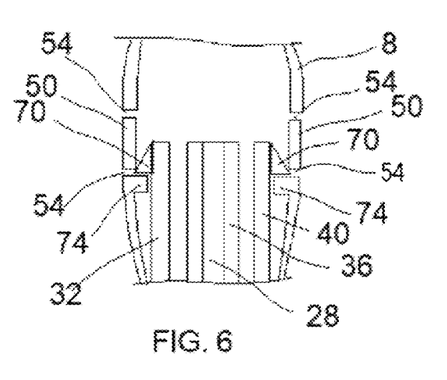
FIG. 6 shows a close-up of a catch system for holding the lip in the body of the fishing lure and for releasing the lip from the body.

FIG. 6 shows a close-up view of an embodiment wherein the first and second lip arms 32 and 40 each have a projection 70, and the body 8 having projections 74 which extend inwardly from the body wall so that once the projections 70 on the first and second lip arms 32 and 40 pass the projections 74 extending inwardly from the body 8, the first and second lip arms 32 and 40 return to their ambient condition (or close thereto) and flat sides of the protections 70 on the first and second lip arms engage a relatively flat side of the projections extending 74 from the body 8, thereby forming a catch. To release the catch, the body arms 50 are pressed inwardly toward the projections 70 on the first and second lip arms 32 and 40 until the projections 70 are pushed inwardly of the projections 74 on the body 8 and the lip 28 can be pulled out of the body.

Figure 7:
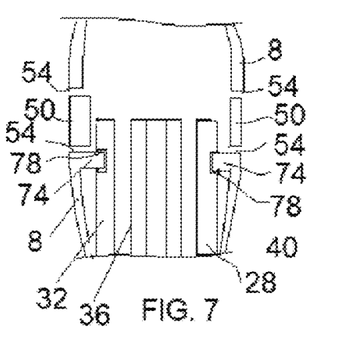
FIG. 7 shows an alternate configuration of a catch system for holding the lip in the body of the fishing lure and for releasing the lip from the body.

FIG. 7 shows a close up of a body 8 which may have one or more projections 74 extending inwardly from the body. Rather than having outwardly extending projections (such as 70 in FIG. 6) which abut against the projections 74 extending inwardly from the body, the lip arms 32 and 40 may each have a recess 78 which receives the body projections 74 and thereby forms a catch to hold the lip 28 in place. To release the lip 28, the body arms 50 are pressed on so they pivot inwardly and engage the lip arms 32 and 40 to push the lip arms inwardly until the body projections 74 are no longer disposed in the recesses 78 in the lip arms. The catch formed by the body projections 74 being disposed in the recesses 78 in the first and second lip arms 32 and 40 provides for a secure retention of the lip in the body 8. It facilitates a toolless release of the lip 28 from the body and allows gripping of the body 8 in a location away from the hooks and in a position naturally used to hold the body. A lip 28 may be changed in a matter of seconds without requiring replacement of the lure 4 on the fishing line 24 until the body arms 50 are pressed inwardly a sufficient distance that the body projections 74 are no longer in the recesses 78.

Figure 8:
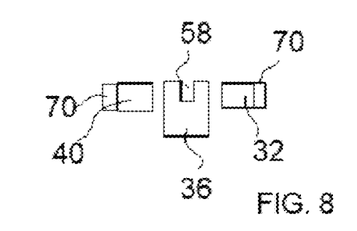
FIG. 8 shows a cross-sectional view taken through a portion of the lip adjacent the distal end thereof.

In some embodiments, such as that shown in FIG. 8, the distal portion of the lip 28 may be formed by three lip arms 32, 36 and 40. The first lip arm 32 may include an arm projection 70 for forming part of the catch. The second lip arm 40 may also include an arm projection 70 for forming part of the catch. The third lip arm 36 may include a channel 58 for receiving the fishing line loop 16.

Figure 9:
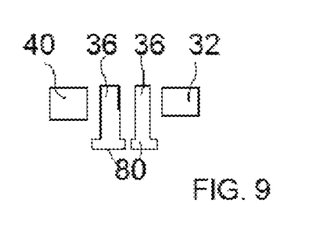
FIG. 9 shows a cross-sectional view of an alternate embodiment of the lip adjacent the distal end thereof.
Figure 10:
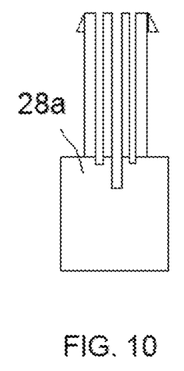
FIGS. 10-13 show a variety of different lips which could be used with the fishing lure of FIG. 1.
Figure 11:
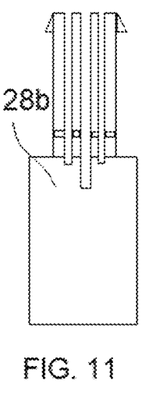
Figure 12:
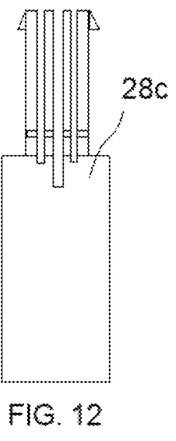
Figure 13:
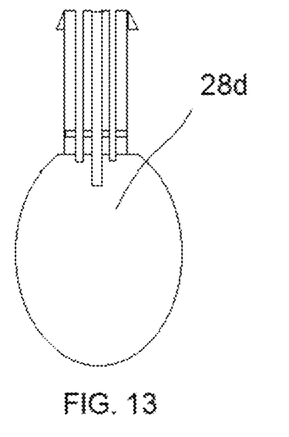

In other embodiments, such as that shown in FIG. 9, the distal portion of the lip 28 may include a first lip arm 32 (which may include an arm projection, or a recess as discussed with respect to FIGS. 6 and 7) a pair of third lip arms 36, each of which may have a flange 80 to provide additional rigidity thereto, and a second arm 40 which may include another arm projection or a recess to engage a body projection as discussed above. Of course, the fishing line loop 16 may be disposed between the pair of second arms or may be configured so it remains above all of the arms.

Turning now to FIGS. 10-13, there are shown different lips 28 which may be inserted into the body to change the action of the fishing lure while being used. The smaller lip 28a is likely to create a shallower dive as the lure is reeled in. The middle lip 28b in FIG. 11 will likely create a deeper dive than smaller lip 28a, but not as deep as the larger lip 28c in FIG. 12. The larger rounded lip 28d in FIG. 13 will create a deep dive and more side-to-side movement of the lure as it is reeled in.

Figure 14:
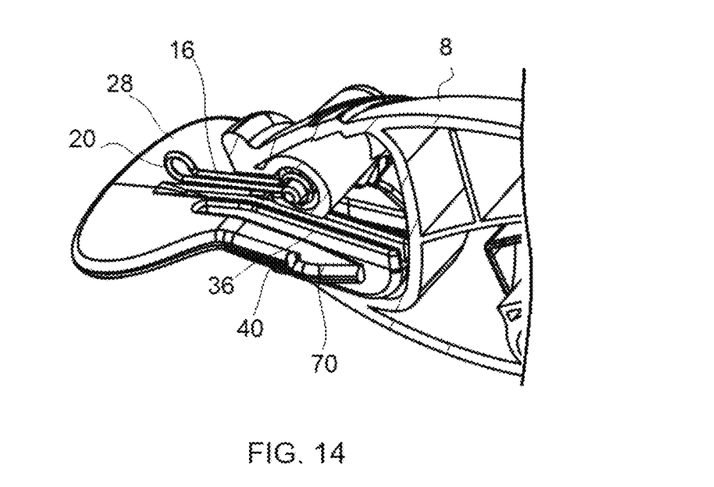
FIG. 14 shows a fragmented, cut-away view showing the interaction of the lip and the body.

Turning now to FIG. 14, there is shown a fragmented, side cut-away view of the proximal end of the body 8 of the fishing lure. A lip 28 is disposed partially within the body 8 and the second arm 40 and third arm 36 are visible. The cut-away has removed the portion of the body 8 holding the body arm and the projection on the body which engages with the projection 70 on the second arm 40 to form the catch. It will be appreciated that the projection 70 may come to a sharp point of may be rounded along the outside edge thereof.

Figure 15:
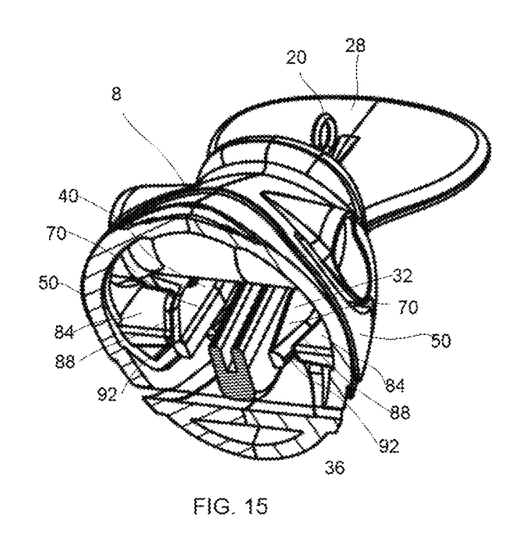
FIG. 15 shows a cross-sectional view of the body with the lip in place.

FIG. 15 shows a cross-sectional view of the body 8 taken just behind the body arms 50 which may have arm projections 84 which extend inwardly toward a middle of the body 8 so as to be positioned adjacent the projections 70 on the first and second arms 32 and 40. As shown in FIG. 15, the arm projections 84 have a concave face 88 which generally matches a convex face 92 along the projections. When the body arms 50 are pushed inwardly, the body arm projections 84 move inwardly and engage the projections 70 on the lip arms 32 and 40 to disengage the projections 70 on the arms from projections within the body (not visible) to thereby release the catch and allow the lip to be withdrawn.

Also shown in FIG. 15 is the third arm 36 of the lip 28. The third arm 36 is longer than the first and second arms 32 and 40 and is thus shown in cross-section. In this particular view, the third arm 36 is generally U-shaped to add thickness and thus support to the lip 28.

Figure 16:
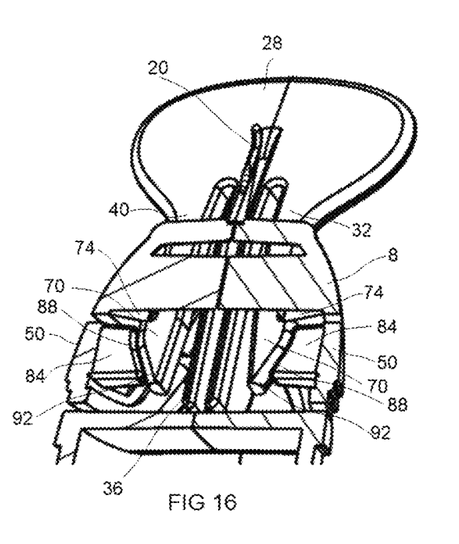
FIG. 16 shows a cross-sectional view of the body parallel to the length of the lip.

FIG. 16 shows a cross-sectional view of the body 8 taken generally parallel to the lip 28. The view shows the body arm projections 84 disposed on the body arms 50, as well as the engagement between the concave face 88 of the body arm projections 84 and the convex face 92 on the projections 70 disposed on the first and second arms 32 and 40 of the lip 28. It will be appreciated that the body arm projections 84 may have convex or flat faces, as can the projections 70 on the first and second arms 32 and 40 of the lip. Also visible in FIG. 16 are the projections 74 on the body 8 which engage the projections 70 on the first and second arms 32 and 40 of the lip 28 to form a catch. Pushing inwardly on the body arms 50 moves the projections 74 inwardly, thereby deflecting the first and second arms 32 and 40 toward the longitudinal axis, thereby allowing the projections 70 on the arms to pass by the projections 74 on the body 8 and the lip 28 to be removed. The third arm 36 of the lip 28 is also visible.

Turning now to FIGS. 17 and 18, there is shown a top view and an end view, respectively, of a lip 28 having a first lip arm 32 and a second arm 40. The lip arms 32 and 40 may each have a projection 70 to engage projections on the body (not shown) to form a catch and hold the lip in the body. The lip arms 32 and 40 may also include protrusions or flanges 44 which extend downwardly to provide additionally rigidity to the lip arms 32 and 40 vertically while still allowing the arms to be deflected inwardly so that the projections 70 can move passed the projections in the body when desired.

Thus, there is disclosed a fishing lure with a removable lip. It will be appreciated that numerous modifications may be made without departing from the scope and spirit of this disclosure. The appended claims are intended to cover such modifications.

What is claimed is:

1. A fishing lure comprising an elongate body defined by an elongate body wall with a slot extending into the elongate body adjacent a proximal end of the elongate body to allow insertion of a portion of a lip into the slot, the body wall having a projection extending inwardly from and formed integrally with the body wall so as to extend into the slot, and a body arm formed integrally with the body wall being defined by one or more elongate openings which extend through the body wall so as to leave a portion of the body arm attached to the body wall and which will flex relative to a remainder of the body wall, the body arm being deflectable inwardly, the body arm being spaced apart from the projection by the one or more elongate openings, and
   a lip having a lip arm which engages the projection extending inwardly from the body wall so as to form a catch to hold the lip in the slot, and wherein a portion of the lip arm is disposed adjacent a portion of the body arm such that pressing inwardly on the body arm causes the body arm to engage the lip arm and move the lip arm out of engagement with the projection to thereby release the catch.

2. The fishing lure of claim 1, wherein the one or more elongate openings comprise an opening which is generally U-shaped.

3. A fishing lure comprising:
   a body formed in a shape of an aquatic creature, the body having a body wall with a proximal end;
   a fishing line loop attached to and extending away from the body wall adjacent the proximal end; and
   a lip releasably attachable to the body adjacent the proximal end so as to extend forward of the proximal end, the lip and the body interacting to form a catch,
   wherein the body comprises at least one projection extending inwardly from the body so as to form part of the catch, wherein the at least one projection comprises a pair of projections disposed on opposing sides of the body, the pair of projections being formed from the body and wherein a first projection of the pair of projections points inwardly toward a second projection of the pair of projections and wherein the second projection points inwardly toward the first projection, and wherein a portion of the lip is disposed between the first projection and the second projection and wherein the lip includes a first projection which engages the first projection of the body and a second projection of the lip which engages the second projection of the body to selectively hold the lip in the body; and
   wherein pressing inwardly on the body wall at a location along the body deflects a portion of the body wall and the portion of the body wall which is deflected disengages the catch to facilitate removal of the lip from the body of the fishing lure.

4. A fishing lure comprising:
   a body formed in a shape of an aquatic creature, the body having a body wall with a proximal end;
   a fishing line loop attached to and extending away from the body wall adjacent the proximal end; and
   a lip releasably attachable to the body adjacent the proximal end so as to extend forward of the proximal end, the lip and the body interacting to form a catch, wherein pressing inwardly on the body wall at a location along the body deflects a portion of the body wall and the portion of the body wall which is deflected disengages the catch to facilitate removal of the lip from the body of the fishing lure, and
   wherein the body has at least one body arm formed therein defined by an opening in the body wall distal from the proximal end so as to allow the at least one body arm to flex relative to a remainder of the body wall to thereby form the portion of the body wall which is deflected and to disengage the catch to facilitate removal of the lip from the body of the fishing lure, and wherein the at least one body arm is disposed adjacent the catch formed between the body and the lip; and
   wherein the lip has at least one lip arm comprising a first lip arm with a projection disposed thereon, and wherein the at least one body arm is disposed adjacent the at least one lip arm such that pressing inwardly on the at least one body arm causes the at least one body arm to deflect inwardly to engage the at least one lip arm to move the projection of the at least one lip arm and thereby release the catch.

5. The fishing lure of claim 4, wherein the at least one body arm comprises a first body arm and a second body arm disposed on opposing sides of the body.

6. The fishing lure of claim 5, wherein the lip having the at least one lip arm further comprises a second lip arm having a projection disposed thereon, and a third lip arm disposed between the first lip arm and the second lip arm.

7. The fishing lure of claim 6, wherein the third lip arm has a flange formed thereon.

8. The fishing lure of claim 7, wherein the body comprises a T-shaped slot formed therein for receiving a portion of the lip.

9. The fishing lure of claim 6, wherein the third lip arm comprises a channel for receiving the fishing line loop.

10. The fishing lure of claim 4, wherein the at least one body arm is disposed on a forward third of the body.

11. A fishing lure comprising:
a removable lip, the removable lip comprising a plurality of arms, at least one of the arms being deflectable, and at least one projection extending from the at least one of the arms which is deflectable;
a body having a proximal end with a slot formed therein for receiving the removable lip, a fishing line loop extending outwardly from the body adjacent the slot, the body defining a body wall formed in a shape of an aquatic creature and defining the slot for insertion of the removable lip into the slot, the body wall having a first projection extending inwardly from the body wall into the slot so as to engage the at least one projection extending from the at least one of the arms which is deflectable when the removable lip is disposed in the slot and thereby form a catch, and a first opening through the body wall and into the slot to define a first body arm formed from a portion of the body wall which is deflectable inwardly relative to portions of the body wall on either side of the first body arm, and adjacent to the first projection, and wherein the first body arm when pressed inwardly into the slot, while a removable lip is disposed in the slot, disengages the at least one projection extending from the at least one of the arms which is deflectable from the first projection extending into the slot to release the catch and thereby allow the removable lip to be removed from the slot in the body of the fishing lure.

12. The fishing lure of claim 11, wherein the body wall has a second opening formed therein generally opposite the first opening, the second opening defining a second body arm integral with the body wall.

13. The fishing lure of claim 12, wherein the first projection is disposed proximal of and immediately adjacent to the first opening defining the first body arm and wherein the body wall comprises a second projection extending inwardly proximal of and immediately adjacent the second body arm.

14. The fishing lure of claim 11, wherein a proximal end of the slot is generally T-shaped.

15. The fishing lure of claim 11, wherein the first body arm comprises support ridges formed thereon.

* * * * *